US005492572A

United States Patent [19]
Schroeder et al.

[11] Patent Number: 5,492,572
[45] Date of Patent: Feb. 20, 1996

[54] METHOD FOR THERMOMAGNETIC ENCODING OF PERMANENT MAGNET MATERIALS

[75] Inventors: Thaddeus Schroeder, Rochester Hills; John R. Bradley, Clarkston; Thomas A. Perry, Washington; Bruno P. B. Lequesne, Troy, all of Mich.

[73] Assignee: General Motors Corporation, Detroit, Mich.

[21] Appl. No.: 345,055

[22] Filed: Nov. 25, 1994

Related U.S. Application Data

[63] Continuation of Ser. No. 818,959, Jan. 10, 1992, abandoned, which is a continuation-in-part of Ser. No. 589,352, Sep. 28, 1990, Pat. No. 5,089,060, and Ser. No. 589,359, Sep. 28, 1990, Pat. No. 5,091,021.

[51] Int. Cl.$^6$ ....................................................... H01F 1/04
[52] U.S. Cl. ........................... 148/103; 148/101; 29/602.1; 219/121.17; 219/121.66
[58] Field of Search ....................................... 148/101, 105, 148/103; 24/602.1; 324/207.22; 219/121.16, 121.17, 121.65, 121.66

[56] References Cited

U.S. PATENT DOCUMENTS

| 4,312,684 | 1/1982 | Chraplyvy et al. | 148/121 |
|---|---|---|---|
| 4,347,086 | 8/1982 | Chraplyvy et al. | 148/101 |
| 5,089,060 | 2/1992 | Bradley et al. | 148/103 |
| 5,091,021 | 2/1992 | Perry et al. | 148/103 |

OTHER PUBLICATIONS

Ara et al, "Formation of Magnetic Grating on Steel Plates by Electron/Laser Beam Irradation", *IEEE Transactions on Magnetics*, vol. 25, No. 5, Sep. 1989, pp. 3830–3832.
Bradley et al, "Microstructure and Magnetic Properties of $Co_2$ Laser Surface Melted Nd–Fe–B Magnets", *Journal of Magnetism and Magnetic Materials*, vol. 86 (Apr., 1990) pp. 44–50.
Croat et al, "Crystallization of Amorphous $Pr_{0.27}Co_{0.73}$: Magnetic Properties and Laser–Induced Coercivity", *Appl. Phys. Lett.*, vol. 37, No. 10, 15 Nov. 1980, pp. 962–964.
Gambino (editor), "Optical Storage Disk Technology", *MRS Bulletin*, vol. XV, No. 4, Apr. 1990, pp. 20–22.
Greidanus et al, "Magneto–Optical Storage Materials", *MRS Bulletin*, vol. XV, No. 4, Apr. 1990, pp. 31–39.
Hansen, "Magneto–Optical Recording Materials and Technologies", *Journal of Magnetism and Magnetic Materials*, vol. 83 Jan. 1990, pp. 6–12.
Herbst et al, "Laser Annealing and Selective Magnetization of Manganese–Aluminum Alloys", *Appl. Phys. Lett.*, vol. 37, No. 8, 15 Oct. 1980, pp. 753–754.
Kryder, "Advanced in Magneto–Optic Recording Technology", *Journal of Magnetism and Magnetic Materials*, vol. 83 Jan. 1990, pp. 1–5.
Lunney et al, "Enhanced Corrosion Resistance $Fe_{40}Ni_{38}Mo_4B_{18}$ and $Nd_{15}Fe_{77}B_8$ by Laser Glazing", *SPIE*, vol. 1023 Excimer Lasers and Applications (1988), pp. 216–223.
Weller–Brophy et al, "Materials Challenges in Integrated Optical Recording Heads", *MRS Bulletin*, vol. XV, No. 4, Apr. 1990, pp. 25–30.

*Primary Examiner*—John Sheehan
*Attorney, Agent, or Firm*—George A. Grove

[57] ABSTRACT

A magnetized or unmagnetized body of a permanent magnet material is heated in a pattern by a laser beam to a temperature sufficient to lower the coercivity of selected heated regions of the pattern and exposed to a magnetic field to magnetize or to remagnetize the selected heated regions. A pattern guide is used in the process to densify the pattern. In the process, energy is directed through the pattern guide and onto the selected regions, while the pattern guide prevents or minimizes heating of unselected portions of the body. Magnets so produced can have very high pole density, digital encoding and analog patterns having gradually varying local field strength.

28 Claims, 7 Drawing Sheets

METHOD FOR THERMOMAGNETIC ENCODING OF PERMANENT MAGNET MATERIALS

RELATED APPLICATIONS

This is a continuation of application Ser. No. 07/818,959 filed on Jan. 10, 1992, now abandoned, which is a continuation-in-part of applications with respective Ser. Nos. 589,352 and 589,359, both filed Sep. 28, 1990, respectively U.S. Pat. Nos. 5,089,060 and 5,091,021, issued in February 1992.

FIELD OF THE INVENTION

This invention relates to a method of forming a magnetically coded pattern in a permanent magnet material and the resulting device, particularly where the microstructure of the material is not affected by the magnetic coding process.

BACKGROUND OF THE INVENTION

In automotive and other industrial applications, special sensors are used to determine shaft speed and angular position, for example, as well as linear motion sensing. Generally such sensors are either of the variable reluctance variety or comprise a toothed wheel (i.e., exciter) spaced from a sensor comprising a magnet and a magnetoresistor or a Hall-effect device. Other types of sensors require multi-bit digital encoding for position sensing and other uses.

A permanent magnet with an appropriate magnetization pattern can serve as the exciter component of a magnetoresistive sensor without the need for a separate bias magnet. However, by conventional production methods currently in use, very small magnet exciters could not be magnetized with a pattern providing the necessary combination of resolution and field strength, and the cost of a large permanent magnet exciter would be prohibitive. If several different magnetization patterns are desired side by side, such as for multi-bit digital encoding, more complex manufacturing problems arise; either machining or magnetizing such an exciter as one unit is very costly and is seldom done.

It has been proposed in U.S. Pat. No. 4,312,684 to Chraplyvy et al entitled "Selective Magnetization of Manganese-Aluminum Alloys" and in U.S. Pat. No. 4,347,086 to Chraplyvy et al entitled "Selective Magnetization of Rare-Earth Transitional Metal Alloys", both assigned to the assignee of the present invention, to create local regions of hard magnetic material in a body or substrate of a special nonmagnetic or soft magnetic material by exposing selected portions or regions of the substrate to a laser beam for heating such portions or regions to a transformation temperature at which magnetic material is formed. The magnetic regions are magnetized in a strong field to produce a permanent magnetic code having sufficient flux density to be readable with a magnetic sensor such as a magnetic tape head. The materials used are expensive and the magnetic fields produced are very weak.

In addition, the paper of Ara et al, "Formation of Magnetic Grating on Steel Plates by Electron/Laser Beam Irradiation", *IEEE Trans. Magnetics*, Vol. 25, No. 5 (1989), p. 3830, discloses an attempt to make a magnetic sensor by forming magnetic gratings on nonmagnetic austenitic stainless steel by laser beam heating of strips on the plate to a temperature sufficient to effect transformation of the heated regions to produce small grains of the ferromagnetic phase in the austenitic phase, and similarly heating a ferromagnetic carbon steel having a ferrite/pearlite phase which was changed to martensite by beam irradiation. The gratings were magnetized and the magnetic flux from each track was detected by a sensor passed over the grating. The signal produced was far too weak to be useful in many applications.

It has also been proposed to alter the magnetic properties of very thin films of special materials for data storage by a thermomagnetic method. In the recording of a magneto-optical disc, the thin layer (about 1 µm thick) of an amorphous transition metal-rare earth alloy is coated on a disc and the entire disc is magnetized in a given direction. A laser is then used to locally heat the surface (typically a 1.6 µm diameter spot) in a static-applied magnetic field to reverse the direction of the disc's magnetization in the heated regions. Because the magnetic regions are so small and magnetically weak, a magnetic sensor such as a magnetoresistor or a Hall-effect device cannot respond to the individual bits of data except from extremely small distances or air gaps which are highly impractical. The data is read optically using the Kerr effect. This requires a beam splitter, two detectors, two linear polarizers, a half-wave plate and beam steering optics. The delicate and complex nature of the detection optics precludes this type of magneto-optical recording from forming the basis of a viable automotive sensor.

Methods which utilize laser beam heating require the use of collimators to narrow the energy beam to a limited diameter or cross-section. Such methods are limited to heating one selected region at a time with the carefully collimated beam so as to maximize heating of selected regions of a body while minimizing heating of any unselected regions. Thus, the cross-section of the energy beam must be carefully controlled and the beam itself must be carefully directed onto each selected region of the body, one region at a time. Despite such careful control, undesired lateral flow of heat in the body from selected to unselected regions occurs. Further, such methods are relatively time consuming and not an optimal method for mass production.

Thus, such methods are restricted by the limited ability to direct the pattern of heat and by the inability to minimize the lateral flow of heat. Accordingly, these limitations restrict the ability to densify the pattern, or closely space the selected and unselected regions.

Therefore, it is desirable to have an improved method for heating and imposing a field which minimizes heating of unselected regions without diminishing the strength of magnetic characteristics carried by the heated selected region. It is also desirable to have such an improved method suitable for use with magnetic bodies of any thickness, including thin film, disc and bulk magnetic bodies, to thereby enable dense patterns to be produced in any magnetic body conveniently, efficiently and economically.

SUMMARY OF THE INVENTION

It is, therefore, an object of the invention to provide a thermomagnetic method of producing magnets with patterned magnetic fields readable by a magnetic sensor at a practical and relatively dense spacing and capable of providing a small, low cost magnet with narrow, closely spaced poles. Another object is to provide such a method for producing digital patterns as well as analog patterns having gradually varying field strength in magnets. It is another object to provide the magnets made by such a process.

Another object is to provide a method which increases the density of a pattern without diminishing the strength of the magnetic characteristics of the regions comprising the pattern, which permits either simultaneous or sequential heating of a plurality of selected regions, which is efficient, convenient and cost effective for mass production of patterned magnetic bodies, and which is conveniently used with magnetic bodies of any desired thickness.

The method of the invention is used to impart a magnetic pattern to a body which may be a thin film, a disc or a bulk magnet material. In a preferred embodiment, a bulk magnet body is prepared with a pattern of magnetic characteristics detectable by sensors such as magnetoresistors and Hall-effect devices. Such detectable magnetic characteristics may be produced beginning with either unmagnetized or magnetized permanent magnet bulk bodies.

In one embodiment, the invention is carried out by a method of imparting a magnetic pattern to a magnetized permanent magnet bulk material comprising the steps of: directing energy in a pattern onto base permanent magnet bulk material to heat a volume of the material to a threshold temperature to lower the coercivity thereof; imposing a magnetic field on the heated pattern greater or stronger than the coercivity of the heated volume, wherein the field imposed on the heated pattern emanates at least partially from the magnetized base material, whereby the treated pattern generates a flux density lower or higher than the base material; and allowing the material to cool in the imposed field, whereby the treated pattern has a magnetic characteristic sufficiently different from the base material to be readily detected by a magnetic sensor. In the case of a previously magnetically saturated magnetic body, a lower flux density arises because the field to which the heated region is exposed emanates from unheated portions of the magnetic body. This effect can be enhanced by an externally imposed field which increases the strength or flux density. In the case of a magnetic body which is not magnetically saturated, an imposed field of either polarity provides regions of differing strengths and/or polarity. Thus, a desired magnetic characteristic, such as orientation, polarity, flux density or strength, can be provided at regions of a magnetic body in any desired pattern, as more fully explained herein.

In another embodiment, the invention is carried out by imparting a magnetic pattern to an unmagnetized permanent magnet bulk material by the steps of: directing energy in a pattern onto unmagnetized base permanent magnet bulk material to heat a volume of the material to a threshold temperature to lower the coercivity thereof; selectively magnetizing the heated pattern by imposing on the pattern a magnetic field stronger than the coercivity of the heated volume and not strong enough to significantly magnetize the unheated material; and allowing the material to cool in said magnetic field, whereby the treated pattern generates a magnetic flux density which is readily detected by a magnetic sensor.

In still another embodiment, the method of the invention utilizes a pattern guide to form a relatively dense magnetic pattern. The pattern guide makes the pattern denser without sacrificing signal strength by increasing the aspect ratio of the heat-affected zone defining the selected region; that is, making the selected region narrower and deeper. This pattern guide is adjacent the permanent magnet body and energy is directed through it and then to the permanent magnet body. The pattern guide adjacent the permanent magnet body may either be in direct physical contact with the body or near to the body and spaced from it. Thus, the pattern guide directs heat to selected regions and minimizes heating of unselected regions. The method basically comprises:

a) providing at least one energy source, a body of permanent magnet material with an outer surface and a thickness, and at least one pattern guide constructed and arranged to direct energy in a predetermined pattern onto the body of permanent magnet material;

b) directing energy from the source through the pattern guide and onto at least one selected portion of the outer surface in a direction generally transverse thereto at an intensity and for a time sufficient to heat the body to a selected depth of the thickness thereof, to a temperature sufficient to lower the coercivity thereof, thereby producing at least one heated selected region while minimizing heating of any unselected portions of the permanent magnet body adjacent the selected region;

c) exposing each one of the heated selected regions to a magnetic field greater than the coercivity thereof and not strong enough to significantly affect the magnetic characteristic of any unselected portions of the permanent magnet body adjacent the selected region; and d) cooling each one of the heated selected regions while exposed to the magnetic field, whereby the selected region exhibits a magnetic characteristic different from the magnetic characteristic of unselected portions of the permanent magnet body adjacent the selected region.

The pattern guide, in one embodiment, is in the form of a solid body with at least one opening through which energy is directed to the selected region or regions. Preferably, the body of the pattern guide has a plurality of openings through which energy is directed to simultaneously heat a plurality of selected regions. Thus, the energy source need not be collimated to a beam of defined cross-section because the openings of the pattern guide define the peripheral extent of energy transmitted therethrough.

Desirably, the solid body of the pattern guide is of a thermally conductive material placed on the permanent magnet body to conduct heat away from unselected portions of the permanent magnet body while selected portions are heated by energy directed through the openings of the pattern guide. Preferably, the thermally conductive pattern guide has a reflective surface to reflect energy incident on the solid portion of the pattern guide adjacent the openings. Preferably, the thermally conductive material of the pattern guide is ferromagnetic at least adjacent the openings to essentially concentrate the magnetic flux in the heated selected region.

In another embodiment, the pattern guide is in the form of a solid body with one or more protrusions arranged to be aligned generally transverse to the outer surface of the permanent magnet body and in heat transfer contact with selected regions so that such regions are heated by energy transferred through the protrusions of the pattern guide.

In still another embodiment, the pattern guide constitutes an integral part of the permanent magnet body at the outer surface of the permanent magnet body and comprises one or more selected regions each encompassed by a recess. Each recess prevents or at least minimizes heat transfer to unselected portions of the permanent magnet body adjacent the heated selected regions.

Advantageously, the pattern guide may be used to produce desired magnetic characteristics in either an unmagnetized or a magnetized permanent magnet body of any thickness. The pattern guide facilitates heating selected regions either simultaneously or sequentially.

The method may be practiced by magnetizing the permanent magnet body prior to heating one or more selected regions, and then cooling the regions while exposed to a magnetic field which emanates at least partially from the magnetized permanent magnet body. Alternatively, the method may be practiced using an unmagnetized permanent magnet body, heating selected regions and cooling them in an imposed external field.

An important advantage of the method is the ability to simultaneously heat selected and well-defined regions using the pattern guide. The pattern imposed may have adjacent regions of alternating polarity such as NSNS or of any desired distribution such as NNSNNSSS (where N denotes north pole and S denotes south pole). A pattern of any desired arrangement of polarities is conveniently and efficiently made by using a pattern guide to heat any desired distribution of first and second selected regions. This method includes heating any desired distribution of first selected regions through a pattern guide and imposing a field of a first polarity thereon while cooling, and then using a pattern guide to heat any desired distribution of second selected regions and imposing a field of a second polarity opposite the first polarity, while cooling the second selected regions. Furthermore, a pattern may be produced which extends in more than one direction along the outer surface.

DESCRIPTION OF THE INVENTION

An unmagnetized permanent magnet body is thermomagnetically encoded by heating selected portions (regions) of the body in a magnetic field and maintaining the field while the heated selected regions cool. The magnetic field is too weak to permanently magnetize the unheated portions (unselected regions) of the unmagnetized body.

The direction of the applied magnetic field can be readily reversed from one heated region of the body to the next, thus the polarity of the magnetized regions can be varied in any desired sequence to form any desired pattern in an unmagnetized permanent magnet body.

The basic method is also applied to form any desired pattern in a previously magnetized permanent magnet body. In the case of a magnetized permanent magnet body, the region of the body heated above a selected temperature is paramagnetic and becomes the location for the preferred return path for the magnetic flux emanating from adjacent unheated (unselected) regions of the permanent magnet body. Upon cooling, the heated selected regions are partially remagnetized in the reversed return path field imposed by either the unselected regions, an external field or both. Preferably, heating is done with a laser beam.

With both initially magnetized and unmagnetized permanent magnet bodies, thermomagnetic encoding exploits the temperature dependence of the coercivity of the magnet; coercivity decreases with increasing temperature. Thus, remanent magnetization is established in the selected regions of the body in which heating is sufficient for the applied magnetic field to exceed the coercivity. This is described in our previously copending application Ser. Nos. 589,352 and 589,359, now U.S. Pat. Nos. 5,089,060 and 5,091,021 issued in February 1992.

A pattern guide is used in the method to produce a pattern which is relatively dense with relatively narrow, closely spaced poles or regions without diminishing the magnetic characteristics of the regions which comprise the pattern. The pattern guide makes the pattern denser without sacrificing signal strength by increasing the aspect ratio of the heat-affected zone defining the selected region; that is, making the selected region narrower and deeper. The pattern guide is used in the method of the invention to pattern or encode unmagnetized and magnetized permanent magnet bodies. The pattern guide produces relatively dense patterns in permanent magnet bodies of any desired thickness including very thin films, thicker discs and bulk magnetic bodies. The term "bulk" is used to distinguish from thin film and very thin film devices. The minimum thickness of a bulk magnet or material is on the order of 1 mm and may be several centimeters thick. Various permanent magnet bodies of various thicknesses are used as the starting material for the method of the invention. The method has been successfully used on ferrites, alnico materials and Magnequench (™) materials, and no magnetic materials have been tried without success. Preferably, in the case where an unmagnetized body is to be patterned, the permanent magnet material has a strong coercivity dependence on temperature so that local regions can be heated and magnetized without magnetizing the surrounding bulk material. Generally, the coercivity decreases as the temperature increases until the Curie temperature is attained. The temperature required for the process depends on the strength of the magnetizing field. There are some magnetic alloys, however, which exhibit a more complicated magnetic behavior as a function of temperature, and heating to a temperature below the Curie point is sufficient to effect a magnetic change. That is, other magnetic materials may undergo structural changes below the Curie temperature, which change their properties and magnetic characteristics. For example, $Nd_2Co_{14}B$ exhibits a spin reorientation phase transition at a temperature $T_s$. Below $T_s$ such materials exhibit an axial easy direction; above $T_s$ the moments will rotate freely in the basal plane. Thus, the Curie temperature need not be reached to apply the patterning process to either type of material.

The materials MQ1 and MQ2 are NdFeB-based alloys having a high energy product and are trademarked products of General Motors Corporation. The U.S. Pat. No. 4,792,367 to Lee, assigned to the assignee of this application, discloses the MQ2 material which is a rare earth-iron-boron based alloy that may include other suitable alloying constituents such as cobalt. The preferred methods of forming permanent magnets from that material include overquenching a molten mixture of the precursors by melt spinning to obtain an amorphous or very finely crystalline material having little intrinsic coercivity and then hot pressing to promote crystal growth to the optimum size for the desired hard magnetic properties; alternatively, the material is hot pressed and hot worked to form the desired fine grained recrystallized microstructure consisting mainly of an $Nd_2Fe_{14}B$-type phase. An intrinsic room temperature coercivity exceeding 15 kOe (thousands of oersteds) is obtained along with very high remanence and high energy product. MQ1 magnets are made of a powdered form of a similar annealed material held together by epoxy bonding.

The basic method of patterning without the use of a pattern guide will be described first, as exemplified by patterning permanent magnet bulk material. This is described in our previously copending applications Ser. Nos. 589,352 and 589,359, now U.S. Pat. Nos. 5,089,060 and 5,091,021 issued Feb. 19, 1992. Then a basic method of patterning with a pattern guide will be described.

The invention is carried out by imparting a magnetic pattern to an unmagnetized permanent magnet bulk material as in U.S. Pat. No. 5,091,021 by the steps of: directing energy in a pattern onto unmagnetized base permanent magnet bulk material (body) to heat a volume of the material to a threshold temperature to lower the coercivity thereof; selectively magnetizing the heated pattern by imposing on the pattern a magnetic field stronger than the coercivity of the heated volume and not strong enough to significantly magnetize the unheated material; and allowing the material to cool in the magnetic field, whereby the treated pattern generates a magnetic flux density which is readily detected by a magnetic sensor.

Figure 1:
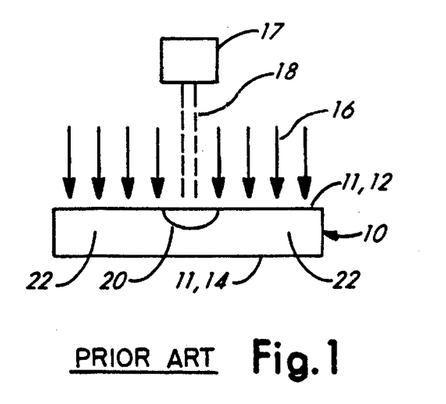
FIG. 1 is a schematic view of a body (substrate) being magnetically patterned.

The method of patterning an unmagnetized bulk permanent magnet body without a pattern guide is exemplified by a bulk permanent magnet of any shape, for example, a plate, disc or an annulus. This is exemplified in FIG. 1 as a flat plate or substrate 10 of unmagnetized or demagnetized permanent magnet material having outer surface 11, including an upper surface 12 and a lower surface 14. The substrate 10 is placed in a magnetic field 16, with either the upper or lower surface oriented so as to be exposed to an energy source 17 which produces energy in a form such as a laser beam 18. The laser beam 18 is then used to impinge on the surface 12 in a pattern to heat a selected region or volume 20 in which the coercivity is lowered from that of the bulk material to a value below the field strength. The magnetic field magnetizes the heated volume as it cools and regains its coercivity; thus, the pattern becomes a permanent magnet. The direction of the magnetic field determines the polarity of the magnet, and by changing the field direction, different parts of the pattern can have different polarities. In this way it is possible to write a grating or other pattern of enhanced magnetic field strength regions on the surface of the body (substrate 10) without altering the microstructure of the material. It should be noted that when the pattern of enhanced field strength is generated at a temperature below the Curie temperature, the applied external field strength must be large to get a high degree of polarization of the region. This strong applied external field will also tend to increase the alignment of the moment in the unselected, nonheat-affected zones of the substrate. To achieve maximum contrast, it is necessary to use a moderate field strength at a pattern temperature above the Curie point.

The invention is carried out by a method of imparting a magnetic pattern to a magnetized bulk permanent magnet material, as in U.S. Pat. No. 5,089,061, by the steps of: directing energy in a pattern onto base permanent magnet bulk material (body) to heat a volume of the material to a threshold temperature to lower the coercivity thereof; imposing a magnetic field on the heated pattern greater than the coercivity of the heated volume, wherein the field imposed on the heated pattern emanates at least partially from the magnetized base material, whereby the treated pattern generates a lower or higher flux density than the base material; and allowing the material to cool in the imposed field, whereby the treated pattern has a magnetic characteristic sufficiently different from the base material to be readily detected by a magnetic sensor.

The method of patterning a magnetized bulk permanent magnet body without a pattern guide is exemplified by a bulk permanent magnet body of any shape, for example, a plate, a disc or an annulus, magnetized in a direction normal to the surface which is to be patterned.

Figures 2, 4:
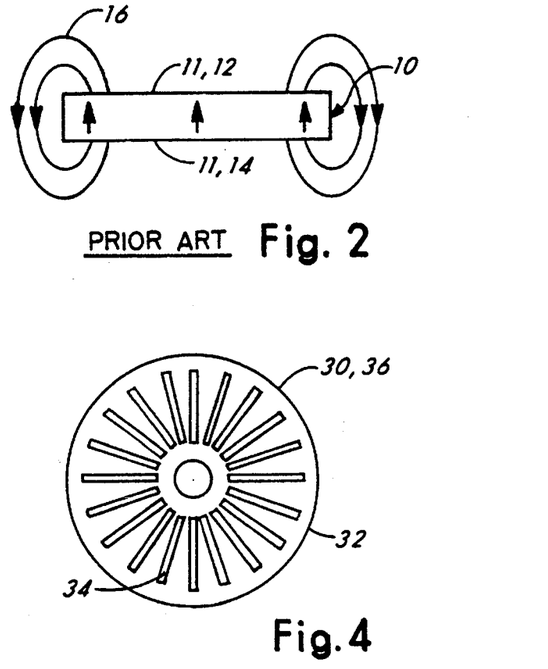
FIG. 2 is a schematic view of a magnetized magnet body used for patterning.
FIG. 4 is a plan view of a pattern guide.
Figure 3:
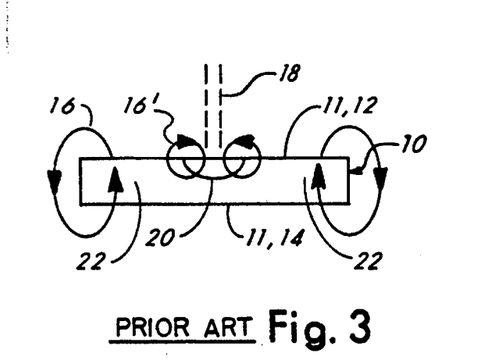
FIG. 3 is a schematic view of a magnet of FIG. 2 being processed.

This is exemplified in FIG. 2 as a substrate which is a flat plate magnet 10 having at least one outer surface 11, including an upper surface 12 and a lower surface 14. The direction of magnetization is normal to the surfaces 12 and 14, and flux lines of magnetic field 16 pass from the upper surface 12 to the lower surface 14 by paths around the edge of the magnet body 10. Referring to FIG. 3, laser beam 18 is then used to create a fine surface pattern of selected regions 20 in which the magnetization is altered from that of the bulk magnet 10. These magnetically altered regions are created by localized laser heating of a volume or selected region 20 adjacent the upper surface 12 above the Curie temperature. The selected region 20 of material heated above the Curie temperature is in a paramagnetic state and extends to some depth below the upper surface 12. The flux 16 coming from the magnet surface near a laser heat-affected track (region) finds a preferred return path by looping through the demagnetized volume. Upon cooling below the Curie temperature, the heat-affected selected region 20 is once again magnetized, this time in the field 16' of the adjacent, unheated unselected regions 22 of the permanent magnet body 10. Because the field in the heat-affected tracks (selected regions 20) is small, remagnetization is only partial. The magnetization thereby induced in the heat-affected selected regions 20 differs in its direction and magnitude from that of the unheated, unselected regions 22 of the magnetic body 10. This net change in magnetization alters locally the near-surface magnetic field of the heated selected regions 20. The end result is a magnet with alternating north and south poles, similar to a conventionally magnetized multipole magnet, but where one of the polarities (that of the unheated unselected region 22) is normally strong while the other one (that of the heated selected region 20) is relatively weak.

In still another embodiment, the method of the invention shown in FIGS. 4 through 10 utilizes a pattern guide 30 to form a relatively dense magnetic pattern. The pattern guide 30 makes the pattern denser, without sacrificing signal strength, by increasing the aspect ratio of the heat-affected selected region 20, making it narrower and deeper. This pattern guide 30 is adjacent the permanent magnet body 10 and energy is directed through it and then to the permanent magnet body 10. The pattern guide 30, adjacent the permanent magnet body 10, may either be in direct physical contact with the body 10 or near to the body 10 and spaced from it. Thus, the pattern guide 30 directs heat to selected regions 20 and minimizes heating of unselected portions 22 of the body 10 adjacent the selected heated region 20. The method basically comprises:

a) providing at least one energy source 17, a body 10 of permanent magnet material with an outer surface 11 and a thickness, and at least one pattern guide 30 constructed and arranged to direct energy 18 in a predetermined pattern onto the body 10 of permanent magnet material;

b) directing energy 18 from the source 17 through the pattern guide 30 and onto at least one selected portion 20 of the outer surface 12 in a direction generally transverse thereto at an intensity and for a time sufficient to heat the body to a selected depth of the thickness thereof, to a temperature sufficient to lower the coercivity thereof, thereby producing at least one heated selected region 20, while minimizing heating of any unselected portions (regions 22) of the permanent magnet body 10 adjacent the selected region 20;

c) exposing each one of the heated selected region or regions 20 to a magnetic field 16 greater than the coercivity thereof and not strong enough to significantly affect the magnetic characteristic of any unselected portions (regions 22) of the permanent magnet body 10 adjacent the selected region 20; and d) cooling each one of the heated selected region or regions 20 while exposed to the magnetic field 16, whereby the selected region 20 exhibits a magnetic characteristic different from the magnetic characteristic of unselected region 22 of the permanent magnet body 10 adjacent the selected region 20.

Figure 5:
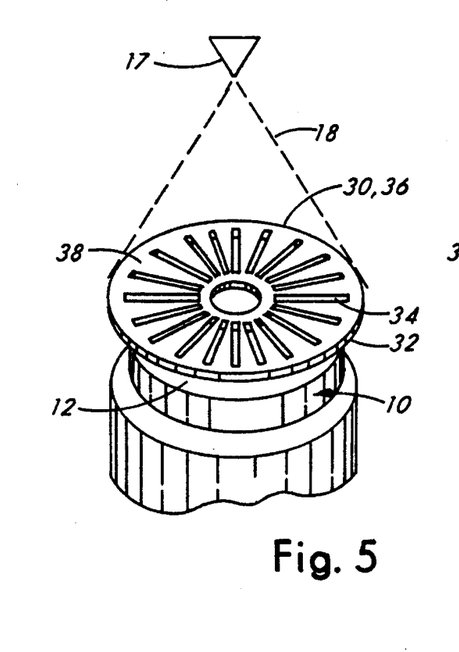
FIG. 5 is a perspective view of a magnetic body being heated by a beam directed through the pattern guide of FIG. 4.
Figure 6:
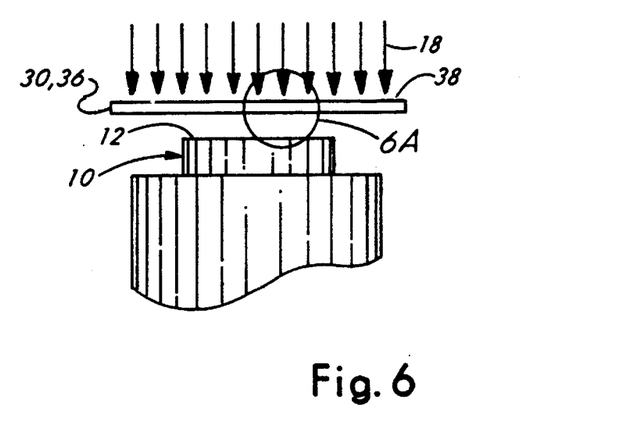
FIG. 6 is a schematic side view of the magnetic body of FIG. 4 being heated by the pattern guide of FIG. 4.
Figure 6A:
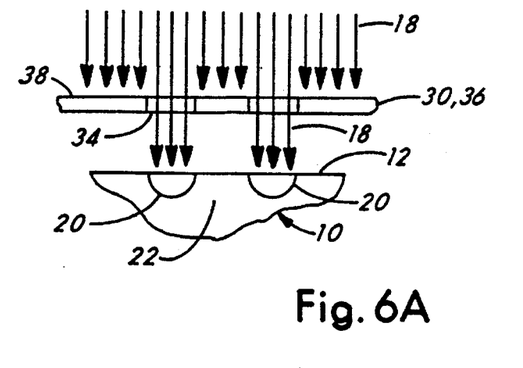
FIG. 6A is an exploded view of the encircled portion of FIG. 6.

In one embodiment, the pattern guide 30 is in the form of a solid body 32 with at least one or more openings 34 (FIG. 4). The pattern guide 30 is placed adjacent an outer surface 12 of the permanent magnet body 10 and energy is directed through one or more openings 34 and then onto each corresponding one of the selected regions 20 underlying the opening 34 (FIGS. 5, 6 and 6A). The pattern guide 30 may be thought of as a mask 36 which permits simultaneous imparting of magnetic characteristics to selected regions 20 of the magnetic body 10 by the method of the invention. The solid body of the mask 36 prevents or at least minimizes the passage of energy to unselected regions 22. Accordingly, a broad beam 18 is used with a cross-section greater than the cross-section of the openings 34 of the pattern guide 30 in the form of a mask 36.

The mask 36 allows the energy beam 18 to create at once a thermal pattern of one or more heated selected regions 20 on the outer surface 12 of the body 10 which corresponds to the desired magnetic pattern. An adjacent or an external magnetic field magnetizes or remagnetizes the heated selected regions 20 creating a magnetic pattern. In the case of a previously magnetized body 10, adjacent unselected (unheated) regions 22 are a source of the magnetic field to which the selected regions 20 are exposed during remagnetization. Such adjacent unselected regions 22 may be the sole source of the field 16 or an external field may also be used. In the case of a previously unmagnetized body 10, the field to which the heated selected regions 20 are exposed is an external field of one polarity or alternating polarity.

The energy beam 18 could be an arc lamp, a xenon discharge lamp, etc. The mask 36 preferably has a highly reflective top surface 38 to reflect the light wavelengths of the beam 18 so as to minimize the heating of the mask 36. As described above, the process may be applied to either magnetized bodies or unmagnetized bodies in the presence of an external magnetic field. Both homopolar and bipolar magnetic patterns may be imprinted. Depending on the desired pattern geometry and starting material (i.e., magnetic or nonmagnetic), bipolar patterns (magnetic) require two exposures and two masks 36, one for imprinting or encoding each of the polarities. The process is applicable to bulk magnets (such as for encoders) and also to thin magnetic films (as those used for information storage). If desired, a plurality of selected regions 20 may be heated sequentially and the mask 36 will still provide an advantage by cutting off the passage of the beam 18 to unselected regions 22.

Figure 7:
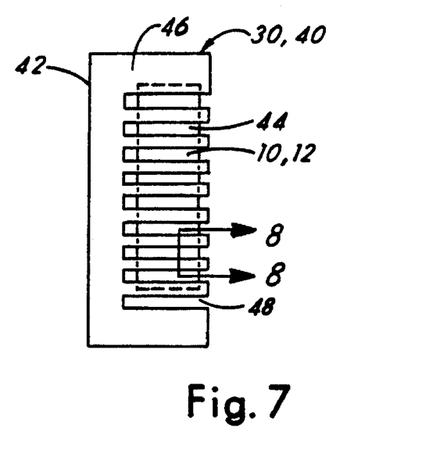
FIG. 7 is a schematic top view of an alternative pattern guide arranged on a magnetic body to be patterned.
Figure 8:
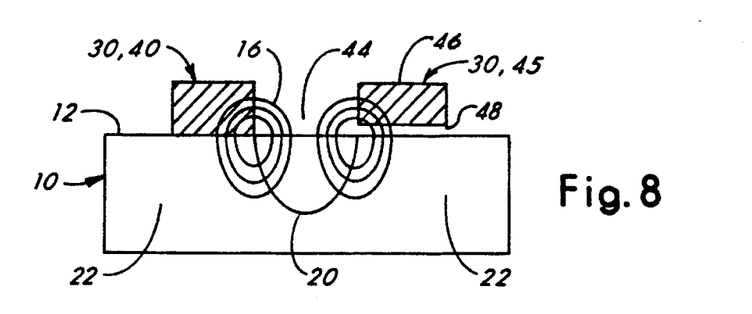
FIG. 8 is a sectional view taken from FIG. 7 and showing the depth of a heated region and concentrated flux lines.

The pattern guide 30 as shown in FIG. 7 is a solid body 40 and is preferably a solid body of thermally conductive material 42. Here the solid conductive body 42 is placed in intimate contact with the magnetic body 10 as the body 10 is patterned. Openings 44 in the conductive body 42 are large enough to allow the beam 18 to pass through to the surface 12 of the magnetic body 10. Heat flow normal to the surface of the magnetic body 10 below the center of the beam 18 is largely unaffected, whereas lateral heat flow at and near the surface 12 is restricted by the cooling influence of the conductive body 42 (FIG. 8). The conductive body 42 restricts the width of the heated selected regions 20 without significantly decreasing the depth thereof, thereby preserving the strength of the signal produced.

Preferably, the solid body 40 is slotted or perforated. The thermally conductive solid body 42 is preferably made of a material with a high thermal conductivity such as copper and is placed in contact with the surface 12 of the magnetic body 10 and has a highly reflective surface 46 opposite the surface 48 in contact with the magnetic body 10 to reduce heat build-up.

Further improvements are provided in addition to those due solely to thermal effects if the solid body 40 is of ferromagnetic material. For example, a magnetically soft material such as iron may be used. Thus, in addition to any thermal effect, the iron serves to concentrate, or focus, the magnetic flux 16 through the heat-affected regions 20.

As shown in FIG. 8, the ferromagnetic effect alone is useful. The solid body 40 with ferromagnetic element 45 spaced from the surface 12 exerts a flux concentrating effect although it does not serve to conduct heat from surface 12. The presence of ferromagnetic material increases the level of magnetization in the heat-affected regions 20 by reducing the reluctance of the flux path outside of the magnet body 10 (FIG. 8). Magnetic bodies patterned with and without the use of the ferromagnetic heat-sink 40 are compared in Example 5 and Comparative Example A.

Figure 9:
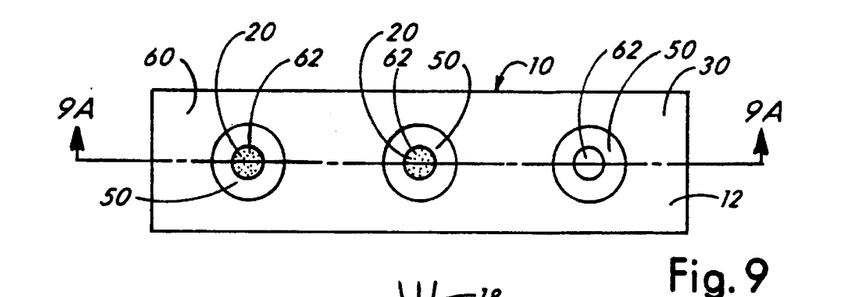
FIG. 9 is a schematic top view of a magnetic body with an alternative pattern guide forming an integral part of the body.
Figure 9A:
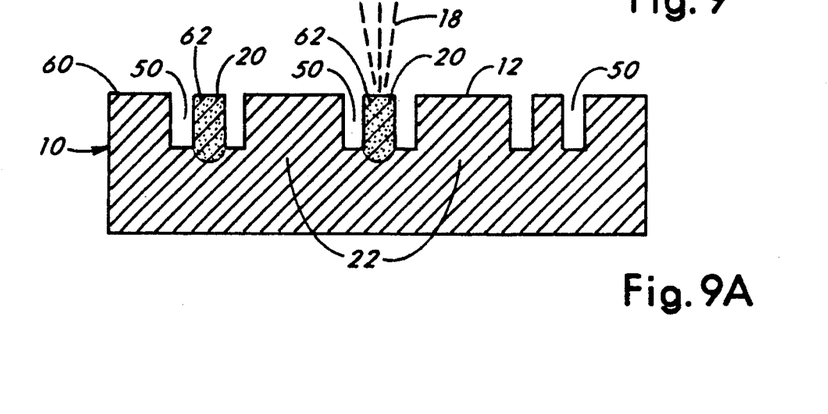
FIG. 9A is a sectional view taken from FIG. 9.

In another embodiment as shown in FIGS. 9 and 9A, the pattern guide 30 constitutes an integral part of the permanent magnet body 10 at the outer surface 12 of the permanent magnet body and comprises one or more selected regions 20 each encompassed by a recess 50. Each recess 50 prevents or at least minimizes heat transfer to unselected portions 22 of the permanent magnet body 10 adjacent the heated selected regions 20. Each recess 50 may contain a substance with a thermal conductivity less than that of the permanent magnet body. Also, the embodiment of FIGS. 9 & 9A may be used with the embodiment of FIGS. 6 & 6A where energy is directed to selected regions of a first pattern guide, which is an integral part of the body, through a second pattern guide which is a mask.

The pattern guide 30 may also comprise a reflective surface finish or coating 60 applied to the unselected regions 22 of the magnetic body 10 to reflect energy incident thereon and a relatively absorptive surface finish or coating 62 applied to selected regions 20 to absorb energy incident thereon (FIG. 9A).

Figure 10:
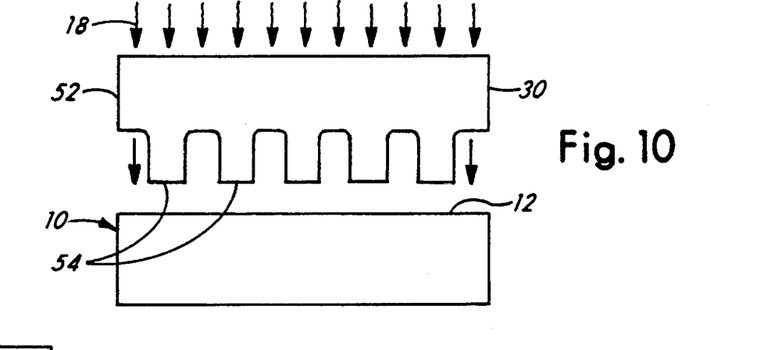
FIG. 10 is a schematic view of a magnetic body arranged to be heated by an alternative pattern guide.

While it is preferred to heat the tracks (selected regions 20) with a laser beam 18, it is considered that other means such as an electron beam or an electric spark heating technique may be used. Surface contact heating is an alternative to pattern heating by an energy beam. This comprises pressing a heated pattern guide 30 ("branding iron") against the outer surface 12 to heat the magnetic body 10 by conduction. The heat directed to the pattern guide 30 may be by any of a variety of means including heating the pattern guide 30 in a furnace prior to pressing it against the magnetic body 10 (FIG. 10). Preferably, the pattern guide 30 is in the form of a solid body 52 with one or more protrusions 54 arranged to be aligned generally transverse to the outer surface 12 of the permanent magnet body 10 and in heat transfer contact with selected regions 20 so that such regions are heated by energy transferred through the protrusions 54 of the pattern guide 30.

Experimental tests employed samples of Magnequench and hard ferrite permanent material. MQ1 samples were in the form of flat 1.4 mm thick wafers, and MQ2 samples were cut from larger blocks of material into various thicknesses varying from 9 mm to 0.9 mm. The Curie temperature of Magnequench material is about 312° C. The hard ferrite samples were of the sintered $BaO-6Fe_2O_3$-type. Each ferrite sample was 6.2 mm thick and ring-shaped with an inside diameter of 18.5 mm and an outside diameter of 43.5 mm. The Curie temperature of the ferrite material is about 450° C.

In tests utilizing unmagnetized permanent magnet bodies 10, the samples were thermally demagnetized or obtained in an unmagnetized state. In tests utilizing magnetized MQ1 and MQ2 permanent magnet bodies 10, the samples were magnetized in a pulsed field oriented normal to their broad faces. The flux density measured at the surface of the MQ1 and MQ2 samples away from their edges varied from about 2.2 to 3 kG (thousands of Gauss). In tests utilizing magnetized hard ferrite samples, the samples were obtained in a magnetized state with a field strength measured away from the edges of the samples of about 550 G.

EXAMPLE 1

Figure 11:
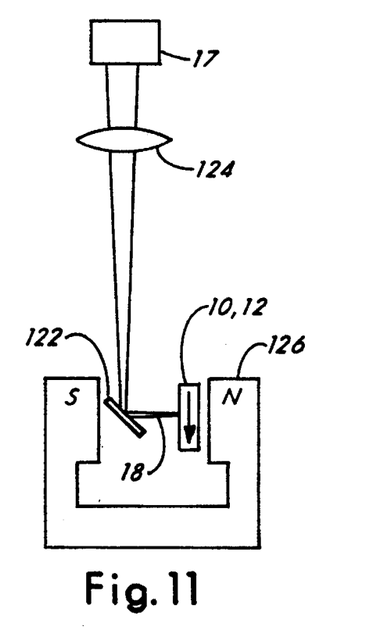
FIG. 11 is a schematic view of one embodiment of apparatus for processing a body (substrate) according to the invention.

The apparatus shown in FIG. 11 was used to demonstrate the method of the invention in a simple form. A flat unmagnetized MQ2 magnet 10 measuring 19 mm×14 mm×9 mm was surface ground and thermally demagnetized by heating to 350° C. for 30 minutes in a vacuum furnace. After cooling, an argon ion laser 17 operating in "all lines mode" was used to scan the outer surface 12 of the sample 10 through a mirror 122. A 350 mm focal length lens 124 was used to produce a slightly defocused beam 18 with a diameter of about 150 μm incident on the surface of the MQ2 magnet 10. The laser 17 operated at a power of 6 W measured near the sample 10. A motorized translation stage (not shown) was used to move the sample 10 in front of the stationary beam at a rate of 0.33 mm/sec (faster scan rates are desirable and equally effective). During patterning, a magnetic field having a strength of 3 kOe produced by a horseshoe magnet 126 was imposed on the sample. In this manner, the sample 10 was covered with a grating of four laser beam modified tracks with a spacing of 2 mm between tracks. These four tracks represent the heated selected regions 20, as described previously.

Figure 12:
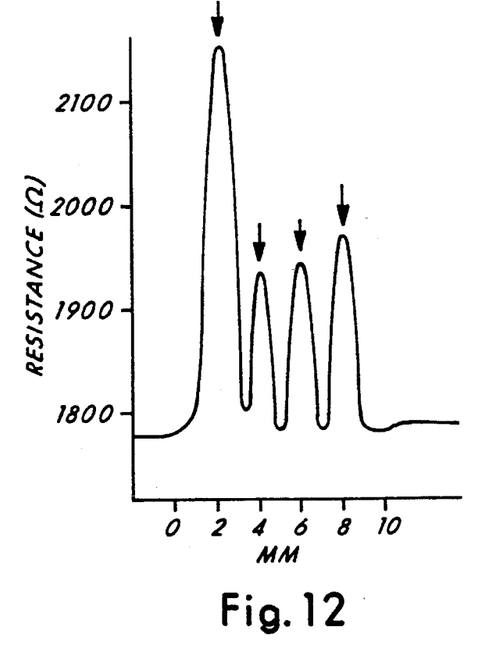
FIG. 12 is a graph of field strength of a magnetic body processed according to the invention and as illustrated in FIG. 11.

The sample 10 containing the grating was translated in front of an InSb magnetoresistor at a spacing of about 0.1 mm between the sample and the magnetoresistor. FIG. 12 shows the resistance of the magnetoresistor versus its position along the grating on the sample 10. Resistance peaks marked by the arrows occur at the tracks of the grating. The peaks represent a roughly 5 percent to 10 percent increase in resistance and correspond to flux density changes up to 100 G. Stronger magnetic signal strengths than those reported here are attainable, being only limited by the geometry of the heat-affected selected regions 20 and the saturation magnetization of the magnet.

EXAMPLE 2

Figure 13:
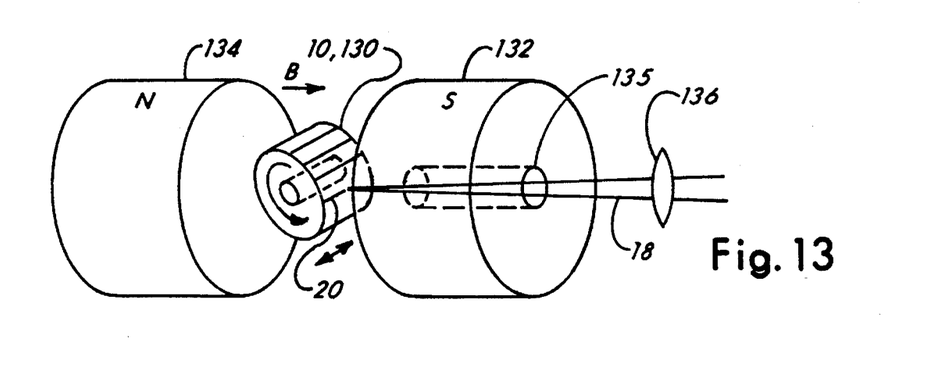
FIG. 13 is a schematic view of another embodiment of apparatus for magnetically patterning a tubular substrate according to the invention.

The apparatus of FIG. 13 was used to magnetically pattern an unmagnetized body 10 in the shape of a tubular or annular sample 130 with alternating poles. A pair of spaced solenoids 132,134 producing a magnetizing field of 1 kOe between them is spaced to accommodate the unmagnetized sample 10 in the field. The solenoid 132 has a central opening 135 which admits a laser beam to the sample. The sample 10 was a tubular bonded MQ1 substrate 130 having a length of 10 mm, an inner diameter of 19 mm and an outer diameter of 21.5 mm and was obtained in an unmagnetized condition. An argon ion laser operating in "all lines mode" was used to scan the surface of the tubular substrate 130. A 350 mm focal length lens 136 was used to produce a slightly defocused beam 18 with a diameter of about 150 μm incident on the surface of the substrate 130. The laser operated at a power of 6 W measured near the substrate 130. A motorized translation stage (not shown) was used to axially move the substrate 130 in front of the stationary beam 18 at a rate of 0.33 mm/sec (faster scan rates are desirable and equally effective). When a track (selected region 20) was thus magnetized at one polarity, the substrate 130 was indexed and the magnetic field was reversed to scan the next track to magnetize it at the opposite polarity. In this manner, the substrate 130 was provided with 48 alternating north and south polarity tracks. Again, stronger magnetic signal strengths than those reported here are attainable by this process.

Figure 14:
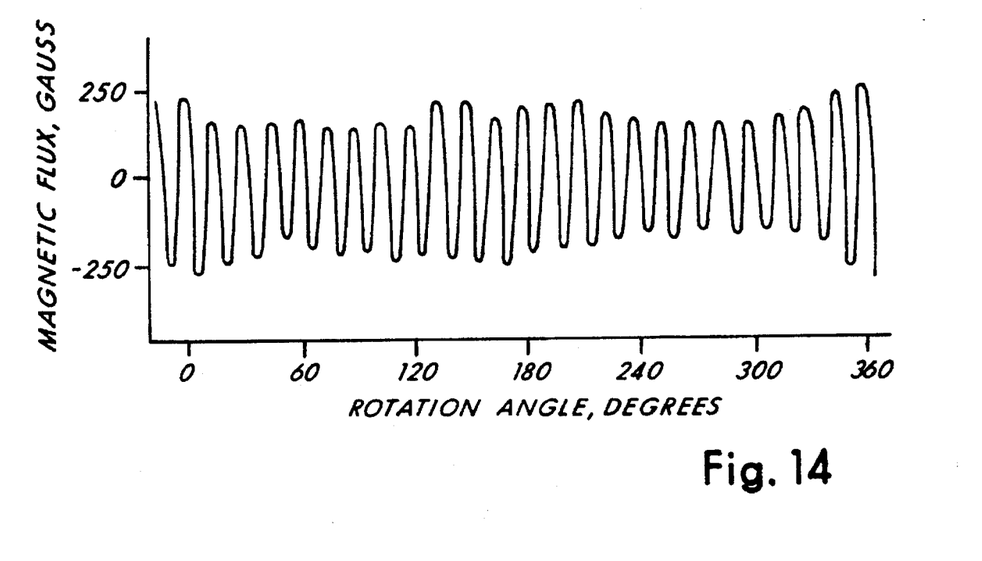
FIG. 14 is a graph of the field strength of a patterned tubular magnetic body processed by the apparatus of FIG. 13.

The multi-poled magnet substrate 130 was rotated in front of a Hall-effect magnetic flux sensor at a spacing from the sensor of about 0.25 mm. The output from the Hall-effect sensor as a function of rotation angle is shown in FIG. 14. The measured field strength varied between −250 G at one pole and 250 G at the other pole.

EXAMPLE 3

A flat, magnetized MQ2 magnetic body 10 measuring about 19 mm×14 mm×9 mm and having a remanent magnetization of about 2.2 kG was scanned by an argon ion laser. A 350 mm focal length lens was used to produce a slightly defocused beam 18 with a diameter of about 150 μm incident on the surface of the magnet. The laser operated at a power of 6 W measured near the body 10. A motorized translation stage (not shown) was used to move the body 10 in front of the stationary beam 18 at a rate of 0.33 mm/sec (faster scan rates would be desirable and equally effective). In this manner, the outer surface 12 of the body 10 was covered with a grating of eight laser beam-modified tracks with a spacing of 2 mm between tracks.

Figure 15:
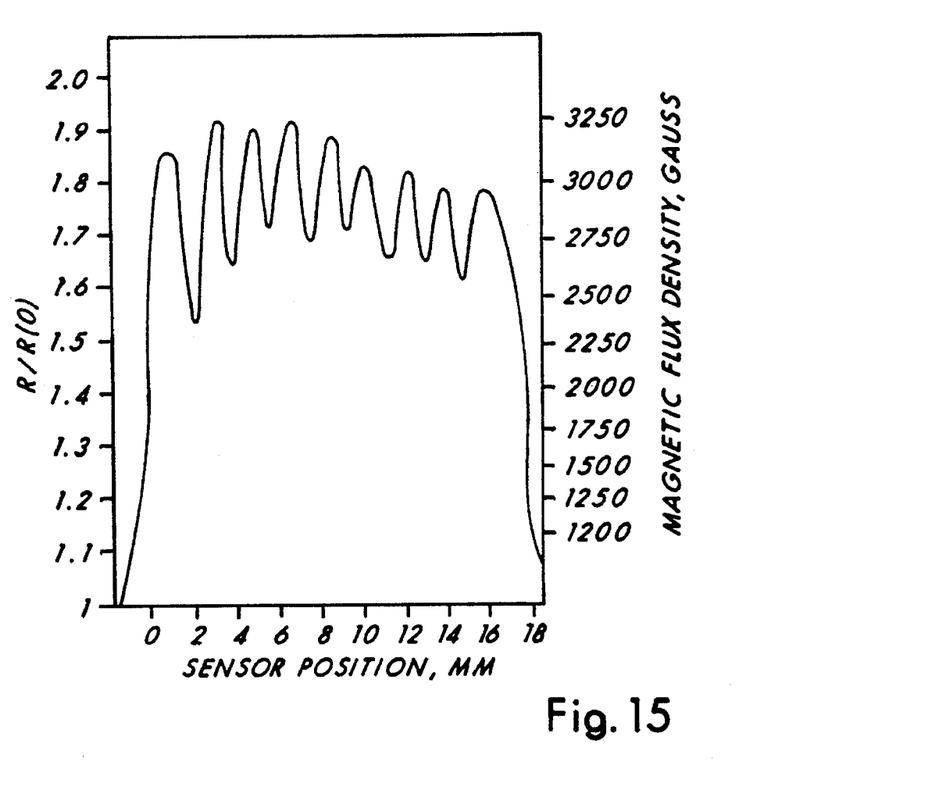
FIG. 15 is a graph of resistance of a magnetoresistive sensor as a function of its position along a magnetic body patterned according to Example 3.

The grating was translated in front of an InSb magnetoresistor at a spacing of 0.1 mm. The ratio R/R(O) of resistance R to its zero field resistance R(O) as a function of the sensor's position along the body 10 is shown in FIG. 15. Each valley in the signal marks the resistance change associated with an individual surface track. The magnetoresistor output corresponds to flux density changes in the range of approximately 500 to 900 G.

EXAMPLE 4

A ring-shaped ferrite magnet body 10 of the $BaO-6Fe_2O_3$-type was obtained from Edmund Scientific in a magnetized condition. A defocused laser beam 18 was directed through the opening 34 in a pattern guide 30, as schematically shown in FIG. 5, so that selected regions 20 of the body 10 corresponding to the openings 34 were heated. The pattern guide 30 was in the form of a disc-shaped mask 36 of steel with a polished, reflective top surface 38 and 20 elongate narrow openings 34, each 0.2 mm in width, and spaced radially about the top surface 38. The beam 18 was a defocused, stationary, 900 watt carbon dioxide laser beam with a diameter of about 4 mm, measured near the surface of the body 10.

The mask 36 was placed between the source 17 of the beam 18 and the body 10, and in this test the mask 36 was carried on the body 10. The body 10 and mask 36 were then rotated on a turntable (not shown) under the stationary beam 18 at a rate of 1.5 seconds per revolution, so that the total time required for heating all selected regions was 1.5 seconds. This was significantly less time than was required to produce an equivalent result without the mask.

The beam diameter of 4 mm was more than 25 times greater in diameter than the 150 μm (0.15 mm) beam of earlier samples 1, 2 and 3, and required correspondingly less collimation. The 0.2 mm wide, elongate openings 34 of the mask 36 prevented passage of the 4 mm beam to unselected portions (regions 22) while the selected regions 20 underlying the openings 34 were essentially sequentially heated. A wider beam 18 of any appropriate width could readily be selected by those skilled in the art to heat a plurality of all selected regions 20 essentially simultaneously.

Figure 16:
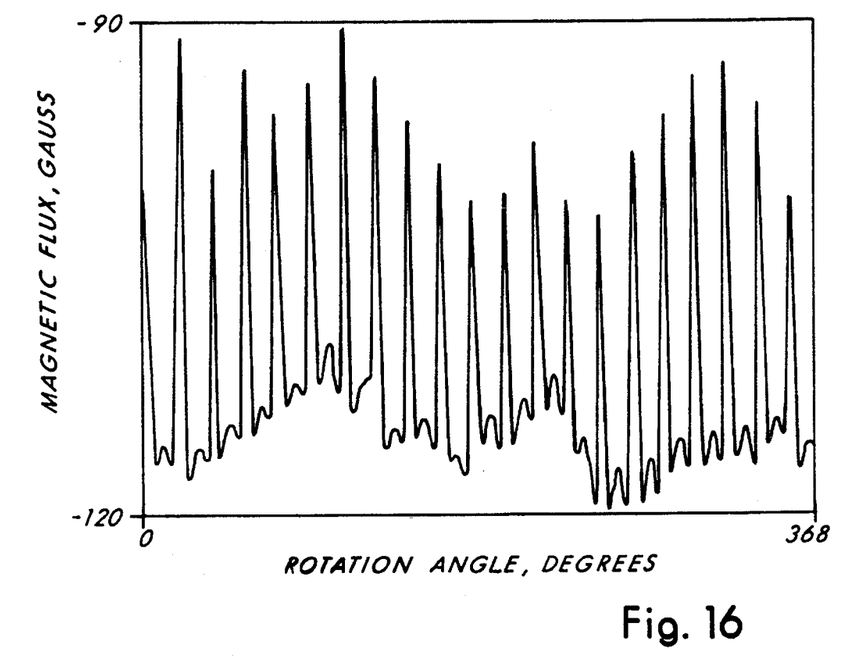
FIG. 16 is a graph of field strength of a magnetic body patterned according to Example 4.

The output from the Hall-effect sensor as a function of rotation angle is shown in FIG. 16. The measured field strength varied from about −0.12 kG (−120 Gauss) to −0.09 kG (−90 Gauss).

EXAMPLE 5

A flat MQ1 permanent magnet body in a magnetized condition was patterned using a 150 μm (0.15 mm) diameter beam directed through openings 44 in a pattern guide 30 formed of a ferromagnetic material, as schematically shown in FIGS. 7 and 8. The pattern guide 30 functioned as a heat-sink 40, drawing heat from unselected portions or regions 22 underlying solid portions of the heat-sink 40. More specifically, the heat-sink pattern guide 40 was in the shape of a flat, thin comb, 1.5 mm thick with eight elongate narrow openings 44, 0.25 mm in width, spaced between teeth of the comb (FIG. 7). The teeth were spaced 1 mm apart, from center to center, to produce a pattern of parallel heated selected regions 20. The 0.15 mm energy beam (not shown) was a 2 watt argon laser beam scanned at a rate of about 0.3 mm/sec between and parallel to the teeth of the heat-sink comb.

Figure 17:
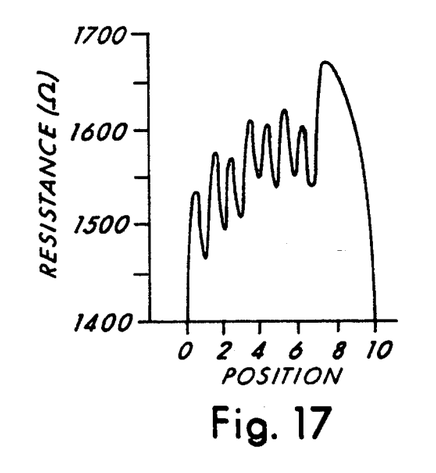
FIG. 17 is a graph of field strength of a magnetic body patterned according to Example 5.

The magnetoresistor output for Example 5 is shown in FIG. 17. The units are ohms and the scale is 10 ohms/division on the strip chart recorder paper. The steel ferromagnetic comb-shaped pattern guide 30 functioned as a heat-sink 40 to improve the signal. Although the spacing between the teeth of the comb was much larger than the laser beam diameter, the lateral flow of heat was effectively controlled by the pattern guide (comb) which drew heat away from unselected portions (regions 22) while focusing the magnetic flux through the heat-affected selected regions 20.

Comparative Example A

A flat MQ1 permanent magnet body 10 in a magnetized condition was patterned using a 150 μm (0.15 mm) diameter 2 watt argon laser beam at a scan rate of about 0.3 mm/sec, the spacing between parallel heated selected regions 20 was maintained as per Example 5, but without the use of any pattern guide.

Figure 18:
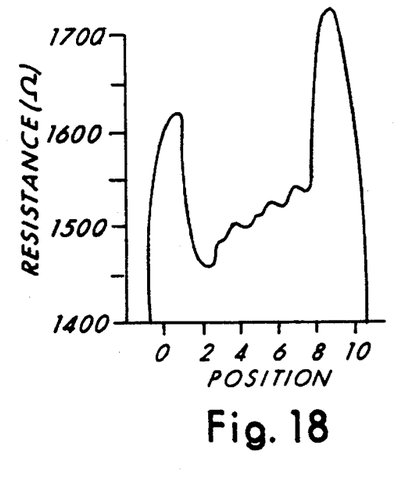
FIG. 18 is a graph of field strength of a magnetic body patterned according to Comparative Example A.

The magnetoresistor output for Comparative Example A is shown in FIG. 18. The improved signal achieved by the method of Example 5 as compared to Comparative Example A is clearly evident. The signal of Example 5 is sharp with distinct peaks and valleys having significant displacement therebetween, whereas the signal of Comparative Example A shows very shallow differences between peaks and valleys. The signal strength produced by Example 5 is at least two and up to five times greater than the signal strength of Comparative Example A.

Subsequent experiments performed on magnets of various thicknesses and with a narrower spacing between tracks yielded essentially the same results. For a sufficiently thin magnet (about 1 mm or less thick), processed under the conditions given above, the heat-affected selected region 20 extends to a depth which is an appreciable fraction of the total sample thickness. In those instances, the pattern could be read by the magnetoresistor on both the patterned and unpatterned (opposite) surfaces of the magnets. The field intensity could be enhanced by locating a ferromagnetic piece, a thermally conductive piece, or both, on the unpatterned side of the magnet as is taught here for the patterned side of the magnet. It was also determined that smoothly polished and surface ground magnets work equally well. The magnetic field from the selected regions can be made stronger by increasing the depth of heating and, therefore, the magnetized volume. Both surfaces of the body may be treated with the same pattern to enhance the effect. A technique for achieving this is to simultaneously heat selected regions on both sides of a thin body using a split laser beam to increase the effective depth without broadening the pattern width.

Other combinations of laser and scanning parameters were employed with no fundamental difference in results. In some cases, laser melting and some material removal occurred to produce surface channels, but the magnetoresistor response to such tracks was indistinguishable from that produced by the unmelted tracks. MQ1 samples were particularly susceptible to such melting but yielded equivalent magnetic results to unmelted MQ1 samples. Laser patterning of ferrite ring magnets also produced surface channels and the magnetoresistor output was qualitatively similar to the Magnequench magnets, but the overall signal was smaller. In the case of an initially magnetized permanent magnet body, the smaller signal is due to the initial magnetization of the ferrite samples. Stronger magnetic signal strengths than those reported here are likely attainable, being only limited by the geometry (aspect ratio) of the heated selected regions and the saturation magnetization of the magnet.

Figure 19:
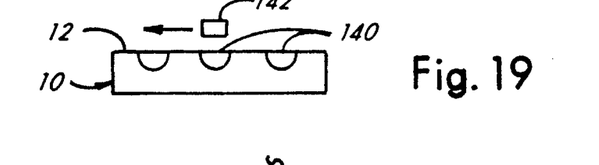
FIG. 19 is a schematic view of a patterned magnetic body according to the invention and a magnetic field sensor.
Figure 20:
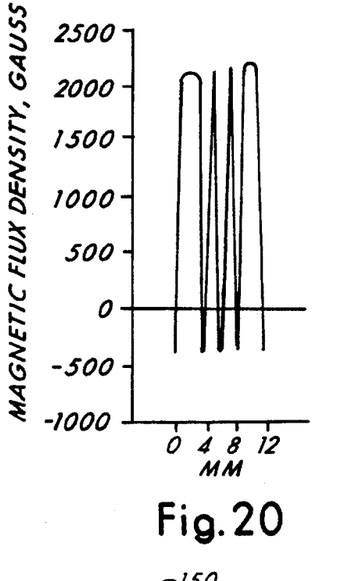
FIGS. 20 and 21 are graphs of magnetic field strength adjacent the patterned magnet of FIG. 19.
Figure 21:
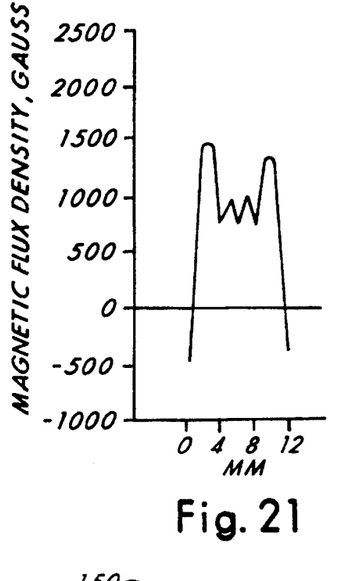

FIG. 19 illustrates a hot pressed MQ2 magnetized magnet 10 which is laser patterned with three tracks 140 about 2 mm apart and a Hall-effect device 142 which is movable transverse of the tracks, as indicated by the arrow, to measure the flux density and to sense the direction of flux. FIG. 20 shows the measured flux density for a sensor spacing of 0.25 mm from the surface 12 of the magnet 10 of FIG. 19. The three tracks 140 produce a sharp reduction of the measured field for each track and even a reversed field as shown at positions 4, 6 and 8 mm. When the sensor is spaced 1 mm from the surface 12, the reductions of field strength are easily measured and still distinct, as shown in FIG. 21, but the reversal of field direction does not occur that far from the surface 12. A magnetoresistive sensor can be used instead of the Hall-effect device to sense the variation of field strength, although it is not sensitive to field direction.

In making patterned magnets by a conventional method, a special magnetizing fixture is made for each type of magnet and the resolution of the magnetic pattern is limited. Patterning magnets by laser processing, particularly with a pattern guide, can be extremely precise, thus allowing a very high density of poles on the surface. A readily attainable density is at least one pole per mm with each track having a heat-affected width of 0.8 mm or less. Denser patterns of 48 poles within a 67 mm span as per Example 2 demonstrate that an array of alternating N and S poles having a density of about one pole per mm is achieved. If the poles or regions (20) of a magnetic body are at some distance apart, signal strength does not depend on polarity. Thus, signal strength will not be affected by spaced apart poles regardless of arrangement, such as NNNN, SSSS or NSNS. However, if the poles are spaced close together, it is preferable and perhaps necessary to have alternating poles NSNSNS where the field from one pole loops through a closely adjacent and opposite pole. As a result, the flux density will be stronger.

Figure 22:
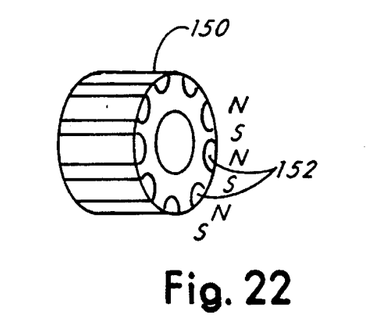
FIG. 22 is an isometric view of a patterned magnetic ring according to the invention.

With reference to a sensor wheel ring magnet 150, as shown in FIG. 22, having a plurality of alternating poles and yielding a field having a plurality of strong and weak flux densities, for a given number of poles on the sensor wheel, this laser process will lead to reduced wheel diameter, reduced magnet volume, lower cost and easier packaging. From a manufacturing point of view, the magnetization process is simplified as the magnetizer is required to produce only a unipolar magnetized magnet ring with the alternating poles being imprinted afterwards by the laser. In addition, this magnetization process is highly flexible since the laser beam intensity, trajectory and scan speed can be easily controlled, for example, by computer. Therefore, the same magnetizing equipment can be used for manufacturing a variety of sensor wheels.

Figure 23:
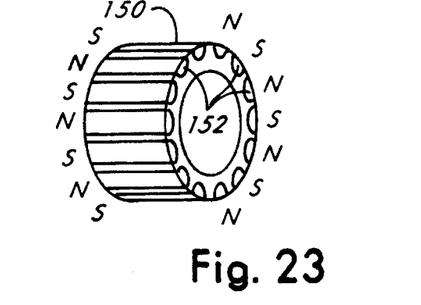
FIG. 23 is an isometric view of an alternately poled magnet for a motor armature according to the invention.

The patterned magnets, both unipolar (where all the treated areas are of the same polarity) and bipolar, are useful as digital encoders and analog devices, and moreover, the bipolar magnets can be used as stepper motor magnets. A ring magnet 150, as shown in FIG. 23, may also be made beginning with an unmagnetized body and patterned by the method of the invention with alternating poles 152 and constructed to include a rotor mounting means (not shown) for attachment to a motor armature.

Figure 24:
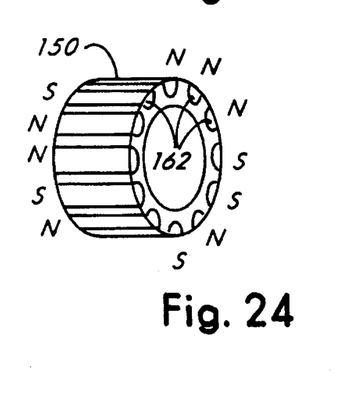
FIG. 24 is an isometric view of a coded magnet having a non-alternating pattern of poles according to the invention.

As indicated in FIG. 24, a ring or other configuration substrate 150 can be imprinted with magnetic tracks 162 having north and south poles in any order, that is, they do not alternate in a regular pattern. For example, the order of poles may be N, N, N, S, S, N, S, N, N, etc.

Figure 25:
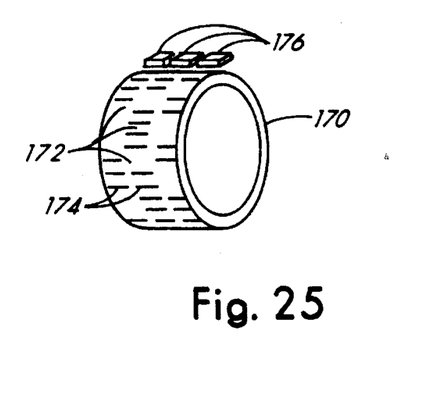
FIG. 25 is an isometric view of a multiple track, digitally coded magnet made according to the invention.

Other types of patterned magnets are readily made by the laser process. Instead of making a simple grating on a wheel or plate, location, size and field direction of selected regions and heating could be controlled to produce any desired array of discontinuous line segments or spots, thereby digitally encoding the surface of the magnet, as illustrated in FIG. 25. A code wheel 170 with three tracks 172 of digital code comprising line segments 174 or dots is read by three sensors 176 adjacent the wheel. During processing, the laser beam is swept across the wheel in any array of parallel lines and the beam is cut-off or interrupted, preferably by a pattern guide, where the imprint is not desired.

Figure 26:
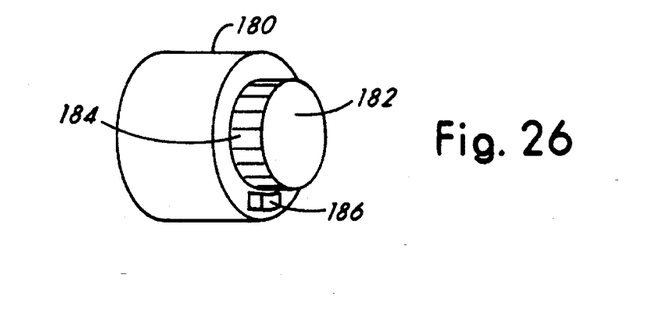
FIG. 26 is an isometric view of an electric motor having an encoded sensor ring according to the invention.

FIG. 26 shows an electric motor 180 having an exposed permanent magnet armature (i.e., rotor) 182 with laser-imprinted code marks 184 on the end or the circumference of the armature 182, and a sensor 186 adjacent the path of the code marks 184 for reading the code as the armature 182 turns, thus sensing the speed or position of the armature 182. In this case, the armature 182 is already required to be magnetized and the encoding process can be accomplished by laser patterning without any additional magnetizing step.

Figure 27:
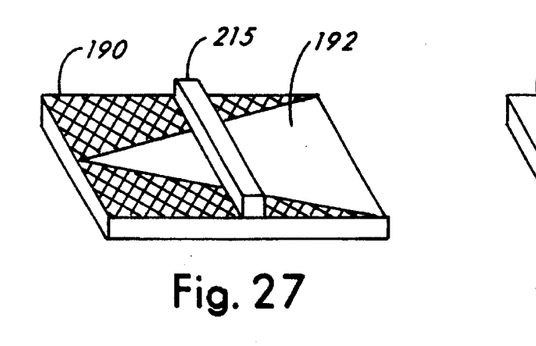
FIG. 27 is an isometric view of an analog pattern for a magnet according to the invention.

Analog magnet patterns can also be produced by the laser process, preferably with a pattern guide. As indicated in FIG. 27, a magnetized permanent magnet body 190 has a V-shaped pattern 192 treated by a laser to yield a flux density which changes gradually along the pattern, becoming weaker as the pattern 192 becomes wider. This occurs because the strongly magnetized portions of body 190 (shown by cross-hatching in FIG. 27) diminish in area.

Figure 28:
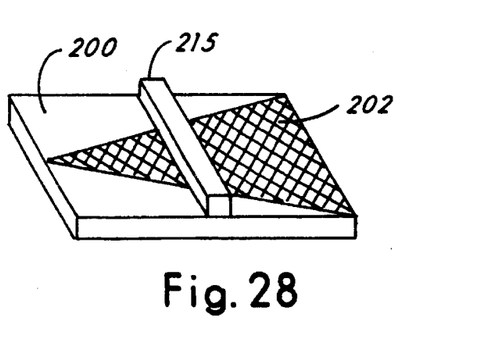
FIG. 28 is another isometric view of another analog pattern for a magnet according to the invention.

As indicated in FIG. 28, a nonmagnetic substrate 200 has a V-shaped magnetic pattern 202 treated by a laser in a magnetic field to yield a flux which changes gradually along the pattern, becoming stronger as the pattern 202 becomes wider. The magnetized V-shaped pattern 202 is shown by cross-hatching in FIG. 28.

Figure 29:
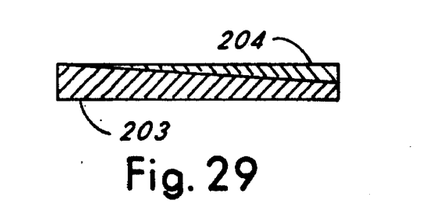
FIG. 29 is a cross-sectional view of still another analog pattern for a magnet according to the invention.

A gradual change in pattern can also be obtained by magnetic body 203 having a laser heated pattern 204, which gradually changes in depth only to yield a gradually changing field (FIG. 29).

Figure 30:
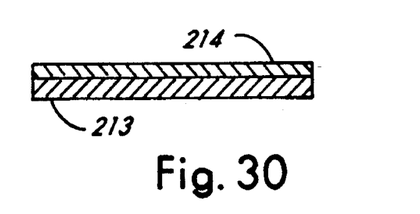
FIG. 30 is another cross-sectional view of another analog pattern for a magnet according to the invention.

FIG. 30 shows a cross-section of a magnetic body 213 with a heated pattern 214, which is of uniform depth and width but having varying strength due to exposure to a varying strength magnetic field.

Each of the patterns shown in FIGS. 27 through 30 are able to be sensed by a magnetoresistive sensor. Examples as shown in FIGS. 27 and 28 show a broad magnetoresistor sensor 215, where the sensor resistance changes as a function of the field strength and thus varies according to the relative position of the magnet and sensor. Upon relative movement of the respective substrates 190,200 and sensor 215, the sensor produces a ramp signal. These examples are essentially potentiometers which may be in the form of an imprinted magnetic pattern on a ring substrate for a rotary potentiometer or on a flat plate for a linear potentiometer. Not shown is a relatively small magnetoresistor sensor sensing a pattern of a constant depth treated by a varying field strength (pattern of FIG. 30), Also not shown is a small magnetoresistor sensor, sensing a pattern of varying depth formed in a constant field strength by modifying either laser power or scan rate (pattern of FIG. 29). Obviously, the examples above merely illustrate the concept of variable depth, area and field strength, and other such modifications are possible with the scope of the invention.

While it is preferred to heat the selected regions with a laser beam, radiant heating by other means as well as surface contact heating are alternatives.

While the invention has been described in terms of a few specific examples, it will be appreciated that others could readily be adopted by one skilled in the art. Accordingly, the scope of the invention is to be considered limited only by the following claims.

The embodiments of the invention in which an exclusive property or privilege is claimed are defined as follows:

1. A method of imparting a magnetic pattern to a body, comprising:
    a) providing at least one energy source, a body of permanent magnet material having an outer surface and a thickness, and at least one solid body pattern guide having at least two areas which cooperate, one or more of the areas being an opening to direct energy in a pattern onto the body of permanent magnet material;
    b) placing the pattern guide adjacent the outer surface of the permanent magnet material;
    c) directing at least a portion of the energy from the source through each one of the openings of the pattern guide and onto one or more corresponding selected regions of the outer surface in a direction generally transverse thereto at an intensity and for a time sufficient to heat the permanent magnet body to a selected depth of the thickness thereof, to a temperature sufficient to lower the coercivity thereof, thereby producing at least one heated selected region while minimizing heating of any unselected portions of the permanent magnet body adjacent the selected region;
    d) exposing each one of the heated selected regions to a magnetic field greater than the coercivity thereof and not strong enough to significantly affect the magnetic characteristic of any unselected portions of the permanent magnet body adjacent the selected region; and
    e) cooling each one of the heated selected regions while exposed to the magnetic field, whereby the selected region exhibits a magnetic characteristic different from the magnetic characteristic of unselected portions of the permanent magnet body adjacent the selected region.

2. A method of imparting a magnetic pattern to a body, comprising:
    a) providing at least one energy source, a body of permanent magnet material having an outer surface and a thickness, and at least one pattern guide having at least two areas which cooperate to direct energy in a pattern, said pattern guide being an integral part of the permanent magnet body at the outer surface of the permanent magnet body and comprising at least one of the areas defining a selected region and another one of the areas being a recess constructed and arranged to encompass the selected region having an extent sufficient to minimize heat transfer to any unselected portions of the permanent magnet body adjacent each one of the selected regions;
    b) directing energy from the source to each one of the selected regions of the outer surface in a direction generally transverse thereto at an intensity and for a time sufficient to heat the permanent magnet body to a selected depth of the thickness thereof, to a temperature sufficient to lower the coercivity thereof, thereby producing at least one heated selected region while minimizing heating of any unselected portions of the permanent magnet body adjacent the selected region;
    c) exposing each one of the heated selected regions to a magnetic field greater than the coercivity thereof and not strong enough to significantly affect the magnetic characteristic of any unselected portions of the permanent magnet body adjacent the selected region; and
    d) cooling each one of the heated selected regions while exposed to the magnetic field, whereby the selected region exhibits a magnetic characteristic different from the magnetic characteristic of unselected portions of the permanent magnet body adjacent the selected region.

3. A method of imparting a magnetic pattern to a body, comprising:
    a) providing at least one energy source, a body of permanent magnet material having an outer surface and a thickness, and at least one pattern guide comprising a solid body having at least two areas which cooperate to direct energy in a pattern onto the body of permanent magnet material, at least one of the areas constituted by a protrusion arranged generally transverse to the outer surface;
    b) directing energy from the source through the pattern guide and onto at least one selected region of the outer surface in a direction generally transverse thereto by directing energy from the source and through each one of the protrusions while maintaining each one of the protrusions in heat transfer relationship with a corresponding one of the selected regions, such energy being at an intensity and for a time sufficient to heat the permanent magnet body to a selected depth of the thickness thereof, to a temperature sufficient to lower the coercivity thereof, thereby producing at least one heated selected region while minimizing heating of any unselected portions of the permanent magnet body adjacent the selected region;

c) exposing each one of the heated selected regions to a magnetic field greater than the coercivity thereof and not strong enough to significantly affect the magnetic characteristic of any unselected portions of the permanent magnet body adjacent the selected region; and d) cooling each one of the heated selected regions while exposed to the magnetic field, whereby the selected region exhibits a magnetic characteristic different from the magnetic characteristic of unselected portions of the permanent magnet body adjacent the selected region.

4. A method of imparting a magnetic pattern to a body, comprising:

a) providing at least one energy source, a body of permanent magnet material having an outer surface and a thickness, and at least one pattern guide having at least two areas, said pattern guide comprising at least one selected region of the outer surface of the body defined by a respective one of the areas prepared with an energy-absorptive finish and any unselected portions thereof defined by one of the areas prepared with a relatively energy-reflective finish;

b) directing energy from the source to at least one selected region of the outer surface in a direction generally transverse thereto at an intensity and for a time sufficient to heat the permanent magnet body to a selected depth of the thickness thereof, to a temperature sufficient to lower the coercivity thereof, thereby producing at least one heated selected region while minimizing heating of any unselected portions of the permanent magnet body adjacent the selected region;

c) exposing each one of the heated selected regions to a magnetic field greater than the coercivity thereof and not strong enough to significantly affect the magnetic characteristic of any unselected portions of the permanent magnet body adjacent the selected region; and d) cooling each one of the heated selected regions while exposed to the magnetic field, whereby the selected region exhibits a magnetic characteristic different from the magnetic characteristic of unselected portions of the permanent magnet body adjacent the selected region.

5. A method of imparting a magnetic pattern to a body, comprising:

a) providing at least one energy source, a body of permanent magnet material having an outer surface and a thickness, and at least one pattern guide, the permanent magnet body being suitable to embody first and second selected regions of, respectively, first and second magnetic characteristics, each one of the regions being defined by a portion of the outer surface and an underlying portion of the thickness of the permanent magnet body, and each one of the pattern guides being in the form of a solid body with openings;

b) directing at least a portion of the energy from the source through the openings of the pattern guide and onto a corresponding one of the first selected regions in a direction generally transverse to the outer surface at an intensity and for a time sufficient to thereby simultaneously heat a selected depth of the first selected regions to a temperature sufficient to lower the coercivity thereof, while minimizing heating of any portions of the permanent magnet body adjacent the first selected regions;

c) imposing a magnetic field on each one of the heated first selected regions greater than the coercivity thereof and not strong enough to significantly affect the magnetic characteristic of any portions of the permanent magnet body adjacent the first selected regions;

d) cooling each one of the heated first selected regions while in the imposed field whereby each one of the first selected regions exhibits a first magnetic characteristic;

e) directing at least a portion of energy from the source through the openings of the pattern guide and onto a corresponding one of the second selected regions in a direction generally transverse to the outer surface at an intensity and for a time sufficient to thereby simultaneously heat a selected depth of the second selected regions to a temperature sufficient to lower the coercivity thereof, while minimizing heating of any portions of the permanent magnet body adjacent the second selected regions;

f) imposing a reverse magnetic field on each one of the heated second selected regions greater than the coercivity thereof and not strong enough to significantly affect the magnetic characteristic of any portions of the permanent magnet body adjacent the second selected regions, the reverse magnetic field having a polarity opposite to that of the magnetic field of step (c); and g) cooling each one of the heated second selected regions while in the imposed reverse magnetic field to thereby yield the second selected regions with a polarity reverse of the polarity of the first selected regions.

6. A method of imparting a magnetic pattern to a body, comprising:

a) providing at least one energy source, a body of permanent magnet material having an outer surface and a thickness, and at least one pattern guide, the permanent magnet body being suitable to embody first and second selected regions of, respectively, first and second magnetic characteristics, each one of the regions being defined by a portion of the outer surface and an underlying portion of the thickness of the permanent magnet body, the pattern guide forming an integral part of the permanent magnet body at the outer surface thereof and comprising recesses, each one of the recesses constructed and arranged to encompass a corresponding one of the selected regions, each recess having an extent sufficient to minimize heat transfer from the selected regions to any portions of the permanent magnet body adjacent the selected regions;

b) directing energy from the source through the pattern guide and to first selected regions in a direction generally transverse to the outer surface at an intensity and for a time sufficient to thereby heat a selected depth of the first selected regions to a temperature sufficient to lower the coercivity thereof, while minimizing heating of any portions of the permanent magnet body adjacent the first selected regions;

c) imposing a magnetic field on each one of the heated first selected regions greater than the coercivity thereof and not strong enough to significantly affect the magnetic characteristic of any portions of the permanent magnet body adjacent the first selected regions;

d) cooling each one of the heated first selected regions while in the imposed field whereby each one of the first selected regions exhibits a first magnetic characteristic;

e) directing energy from the source through the pattern guide and to second selected regions in a direction generally transverse to the outer surface at an intensity and for a time sufficient to thereby heat a selected depth of the second selected regions to a temperature sufficient to lower the coercivity thereof, while minimizing heating of any portions of the permanent magnet body adjacent the second selected regions;

f) imposing a reverse magnetic field on each one of the heated second selected regions greater than the coercivity thereof and not strong enough to significantly affect the magnetic characteristic of any portions of the permanent magnet body adjacent the second selected regions, the reverse magnetic field having a polarity opposite to that of the magnetic field of step (c); and g) cooling each one of the heated second selected regions while in the imposed reverse magnetic field to thereby yield the second selected regions with a polarity reverse of the polarity of the first selected regions.

7. A method of imparting a magnetic pattern to a body, comprising:

a) providing at least one energy source, a body of permanent magnet material having an outer surface and a thickness, and at least one pattern guide, the permanent magnet body being suitable to embody first and second selected regions of, respectively, first and second magnetic characteristics, each one of the regions being defined by a portion of the outer surface and an underlying portion of the thickness of the permanent magnet body, the pattern guide comprising a solid body with at least one protrusion arranged generally transverse to the outer surface;

b) directing energy from the source through the pattern guide and to first selected regions, in a direction generally transverse to the outer surface by directing energy from the source to and through each one of the protrusions of the pattern guide while maintaining each one of the protrusions in heat transfer contact with a corresponding one of the first selected regions, such energy being at an intensity and for a time sufficient to thereby heat a selected depth of the first selected regions to a temperature sufficient to lower the coercivity thereof, while minimizing heating of any portions of the permanent magnet body adjacent the first selected regions;

c) imposing a magnetic field on each one of the heated first selected regions greater than the coercivity thereof and not strong enough to significantly affect the magnetic characteristic of any portions of the permanent magnet body adjacent the first selected regions;

d) cooling each one of the heated first selected regions while in the imposed field whereby each one of the first selected regions exhibits a first magnetic characteristic;

e) directing energy from the source through the pattern guide and to second selected regions in a direction generally transverse to the outer surface by directing energy from the source to and through each one of the protrusions of the pattern guide while maintaining each one of the protrusions in heat transfer contact with a corresponding one of the second selected regions, such energy being at an intensity and for a time sufficient to thereby heat a selected depth of the second selected regions to a temperature sufficient to lower the coercivity thereof, while minimizing heating of any portions of the permanent magnet body adjacent the second selected regions;

f) imposing a reverse magnetic field on each one of the heated second selected regions greater than the coercivity thereof and not strong enough to significantly affect the magnetic characteristic of any portions of the permanent magnet body adjacent the second selected regions, the reverse magnetic field having a polarity opposite to that of the magnetic field of step (c); and g) cooling each one of the heated second selected regions while in the imposed reverse magnetic field to thereby yield the second selected regions with a polarity reverse of the polarity of the first selected regions.

8. A method according to claims 1 or 5, wherein the pattern guide comprises a plurality of the openings through which energy is directed onto a plurality of the selected regions to thereby heat a plurality of the selected regions.

9. A method according to claim 8, wherein the energy is in the form of a beam with a cross-section sufficient to heat a plurality of the selected regions simultaneously.

10. A method according to claim 3, wherein the energy is in the form of a beam with a cross-section suitable to sequentially heat a plurality of the selected regions.

11. A method according to claims 1 or 5, wherein the solid body of the pattern guide has a first surface adjacent the outer surface of the permanent magnet body and a reflective second surface opposite the first surface.

12. A method according to claims 1, 3, 5 or 7, wherein the pattern guide is ferromagnetic.

13. A method according to claims 1 or 7, wherein the solid body of the pattern guide comprises a thermally conductive material, and wherein the step of placing the pattern guide adjacent the outer surface includes placing the pattern guide in heat transfer relationship with the outer surface of the permanent magnet body, whereby the thermally conductive body conducts heat away from any unselected portions of the permanent magnet body adjacent the selected region.

14. A method according to claim 13, wherein the thermally conductive material is ferromagnetic.

15. A method according to claim 2, wherein the pattern guide consists of a plurality of the selected regions each encompassed by a respective one of the recesses, and wherein energy is directed so as to simultaneously heat the selected regions.

16. A method according to claim 2, wherein the pattern guide consists of a plurality of the selected regions each encompassed by a respective one of the recesses, and wherein energy is directed through another pattern guide disposed between the outer surface of the body and the energy source which comprises a plurality of openings through which energy is directed to the selected regions so as to simultaneously heat the selected regions.

17. A method according to claim 2, wherein the recess contains a substance with a thermal conductivity less than that of the permanent magnet body.

18. A method according to claim 3, wherein the pattern guide comprises a plurality of protrusions simultaneously heated while each is maintained in heat transfer relationship with a corresponding one of the selected regions.

19. A method according to any one of claims 1 through 7, wherein the energy source is a laser.

20. A method according to any one of claims 1 through 7, wherein the step of exposing the heated selected regions to the magnetic field includes changing the polarity of the magnetic field in accordance with the desired polarity of the selected region being heated to thereby yield selected regions having north and south poles.

21. A method according to any one of claims 1 through 4, wherein before step (b) the permanent magnet body is magnetized, and wherein the magnetic field in step (c) emanates at least partially from the magnetized permanent magnet body.

22. A method according to any one of claims 1 through 4, wherein before step (b) the permanent magnet body is magnetized and thereby emanates a magnetic field and wherein the magnetic field in step (c) includes an external magnetic field in opposition to the magnetic field emanating from unselected portions of the magnetized permanent magnet body, so that the magnetic field imposed on each one of the selected regions emanates partially from the magnetized permanent magnet body and partially from the external magnetic field.

23. A method according to claim 5, wherein only one pattern guide is used and further including after step (b) relatively moving the pattern guide and the permanent magnet body to align each of the openings of the pattern guide with a corresponding one of the second selected regions.

24. A method according to claim 5, wherein first and second pattern guides having openings respectively aligned with the first and second selected regions are used, and further including in step (b) directing energy through the openings in the first pattern guide to the first selected regions, and in step (e) directing energy through the openings in the second pattern guide to the second selected regions.

25. A method according to claim 5, wherein the solid body of the pattern guide has a first surface adjacent the outer surface of the permanent magnet body and a reflective second surface opposite the first surface.

26. A method according to claim 5, wherein the solid body of the pattern guide comprises a thermally conductive material and wherein each one of the steps of directing energy, respectively, includes maintaining the pattern guide in heat transfer contact with the outer surface of the permanent magnet body, whereby the thermally conductive body conducts heat away from any portions of the permanent magnet body adjacent the selected regions.

27. A method according to claim 6, wherein the recess contains a substance with a thermal conductivity less than that of the permanent magnet body.

28. A method according to any one of claims 1 through 7, wherein the steps of directing energy each further include relatively moving at least one of the energy source, the pattern guide and the permanent magnet body.

* * * * *